June 28, 1960

S. MEURER 2,942,592

INTERNAL COMBUSTION ENGINE

Filed June 30, 1958

INVENTOR
Siegfried Meurer

BY
Bailey, Stephens & Huettig
ATTORNEYS

United States Patent Office

2,942,592
Patented June 28, 1960

---

2,942,592

INTERNAL COMBUSTION ENGINE

Siegfried Meuer, Nurnberg, Germany, assignor to Maschinenfabrik Augsburg-Nurnberg A.G., Nurnberg, Germany Filed June 30, 1958, Ser. No. 745,442

Claims priority, application Germany July 10, 1957

8 Claims. (Cl. 123—32)

This invention relates to an internal combustion engine and, in particular, to an engine of the type disclosed in the patent to Meurer et al., No. 2,907,308, dated October 6, 1959, for "Operation of Internal Combustion Engines."

In the aforesaid application, the major portion of the injected fuel is applied directly to the wall of the combustion chamber in the piston, while the minor portion of the fuel is atomized in the combustion air. The fuel is applied to the wall without rebounding therefrom and over as large an area as possible. This is done by injecting the fuel over a short path tangential to the wall. The combustion air is swirled over the film of fuel so that the fuel vaporized from the film is mixed with the air. The minor portion of the fuel is atomized from the surface of the fuel jet, or is accomplished by the use of a separate fuel jet. This atomized fuel is self-ignited and serves to ignite the fuel vaporized from the combustion chamber wall. However, the vaporized fuel can be ignited by other means, such as a spark plug, or by the use of separate ignitible fuels chosen according to the compression ratio in the cylinder so that a self-ignition occurs, but without igniting the liquid fuel deposited as a film on the combustion chamber wall. The liquid fuel on the wall is not more than 98 percent of the total injected fuel, while the minor portion of atomized fuel is at least 2 percent of the injected fuel and at a maximum not more than that which would produce a just noticeable ignition noise during the running of the engine.

In my copending application, Serial No. 735,758, filed May 16, 1958, for "Piston," it has been disclosed that, when the fuel is injected before the top dead center position of the piston, the fuel can be held on the wall by means of grooves formed in the surface of the wall. It has now been discovered that such grooves will hold the fuel as a film on the wall so that the fuel can be applied to the wall before the end of the intake air suction stroke and during the beginning of the compression stroke. Thus, according to the instant invention, the fuel injected toward the end of the suction stroke forms a film in the combustion chamber which has time to be spread over a large surface area during the compression stroke and produces an unobjectionable fuel-air mixture in the combustion chamber. Furthermore, the fuel is injected into the combustion chamber at a much lower pressure than exists at the end of the compression stroke. The grooves are formed according to my application Serial No. 735,758 so that the film of fuel is not disturbed by the inertia forces caused by the movement of the piston.

According to this invention, the fuel is injected approximately at the end of the suction stroke by means of an injection device positioned in the wall of the cylinder and further by a fuel passageway formed in the piston. The fuel passageway is directed tangentially of the wall of the combustion chamber in order to form the film of fuel on the wall, and the opening of the passageway into the combustion chamber is in the area of the fuel holding grooves.

In order to prevent the fuel from becoming blocked in the fuel passageway, the latter is downwardly inclined from adjacent the piston head toward the center of the piston. The movement of the fuel through the passageway is improved by means of a bore extending approximately parallel to the longitudinal axis of the piston from the bore to the surface of the piston head so that the bore communicates with the cylinder space. During the compression stroke, compressed air is forced into the bore and the passageway into the combustion chamber and carries along the injected fuel.

The means by which the objects of the invention are obtained are described more fully with reference to the accompanying drawings, in which.

Figure 1:
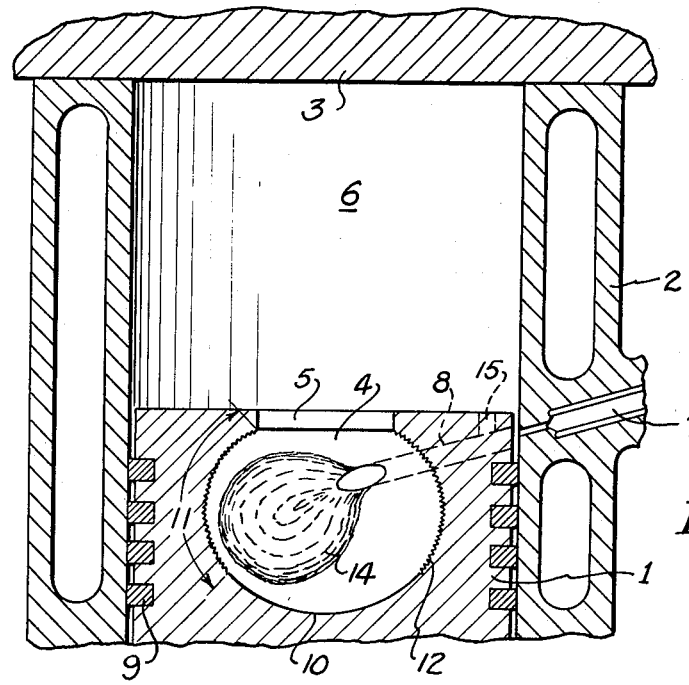
Figure 1 is a cross-sectional view through a cylinder and the piston therein, with the fuel holding grooves shown in approximately actual size.
Figure 2:
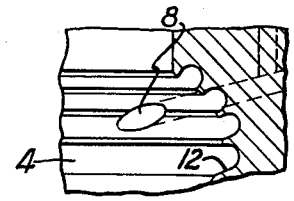
Figure 2 is an enlarged detailed cross-sectional view of a portion of the combustion chamber wall of Figure 1.

Piston 1 reciprocates in cylinder 2 having cylinder head 3. Combustion chamber 4 in the form of a body of rotation communicates through neck opening 5 with cylinder space 6.

Figure 3:
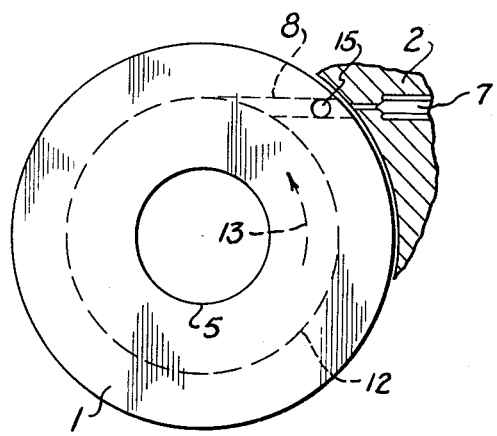
Figure 3 is a plan view of the piston head with a fragmentary sectional view through the cylinder wall and fuel injection device.

An injection device 7 composed of a needle valve mounted in the cylinder wall is adapted to communicate with a fuel passageway 8 formed in piston 1. The needle valve is obliquely mounted in the cylinder wall. Passageway 8 is inclined downwardly from the side wall surface of the piston adjacent the surface of the piston head above the top ring 9 toward the center of the piston and into the combustion chamber. Fuel injection device 7 and passageway 8 are so located that their openings toward the cylinder wall will be in communication when the piston is at bottom dead center position between the suction and compression strokes. As shown in Figure 3, passageway 8 extends tangentially to wall 10 of chamber 4. This wall, in the area 11 of the opening of passageway 8, is provided with fuel holding grooves 12. These grooves extend either annularly or helically around the combustion chamber wall. Grooves 10 also have a curved bottom and as seen in cross-sectional view have a curved circumference which can be either semi-circular or oval. However, other curved cross-sections may be used. These grooves form a coarse surface on the combustion chamber wall in the area of the introduction of the fuel into the combustion chamber. The combustion air is swirled in the direction of the arrow 13 within chamber 4 and passes over the opening of passageway 8. When the openings of injection device 7 and passageway 8 are in communication between the suction and compression strokes at bottom dead center of the piston, fuel enters passageway 8 coming from the fuel nozzle. This fuel flows through passageway 8 into chamber 4, covers grooves 12 and without rebounding is spread as a film 14 on the wall 10. The flow of the fuel through passageway 8 is assisted by the inclination of the passageway during the piston compression stroke, as the fuel is aided by gravity in its flow in the slanted passageway into the combustion chamber. A bore 15 extending from passageway 8 to the surface of the piston head also assists in the flow of the fuel by reason of the compressed air coming from the cylinder space 6 and forced into the passageway 8. This air flow is formed by a pressure difference in which the combustion chamber has a less pressure than that in cylinder space 6 because of the opening in neck 5. This pressure difference becomes larger as the diameter of neck 5 decreases and can be fixed by the diameter of neck 5. Furthermore, the diameter of neck 5 also determines the velocity of air swirl within the combustion chamber.

Having now described the means by which the objects of the invention are obtained, I claim:

1. A method of operating a self-ignition internal combustion engine in which the fuel is injected into the combustion chamber in a piston with the major portion of the fuel forming a film held by grooves in the wall of the combustion chamber, vaporized and mixed with an air swirl, and the minor portion of the fuel being atomized in the combustion air for self-ignition, comprising injecting the fuel beginning approximately at the end of the piston intake air suction stroke.

2. A method as in claim 1, said fuel injection continuing during the piston compression stroke.

3. An internal combustion engine having a cylinder, a piston slidable in said cylinder throughout an air intake stroke and a compression stroke, a combustion chamber in said piston, grooves in the wall of said chamber forming a roughened surface for holding a film of fuel, and a fuel injection device positioned in said cylinder for injecting fuel into said chamber approximately at the end of the air intake stroke of said piston.

4. An engine as in claim 3, further comprising a fuel passageway extending through said piston from said combustion chamber to the outer surface of the piston and adapted to communicate with said fuel injection device.

5. An engine as in claim 4, said passageway being substantially tangential to the wall of said chamber.

6. An engine as in claim 5, said passageway opening into said chamber in the area of said grooves.

7. An engine as in claim 6, said passageway being inclined downwardly from adjacent the surface of said piston head toward the opening in said wall.

8. An engine as in claim 7, further comprising a bore extending from said passageway to the surface of the piston head.

References Cited in the file of this patent

UNITED STATES PATENTS

| | | |
|---|---|---|
| 2,808,037 | Von Seggern et al. | Oct. 1, 1957 |
| 2,832,325 | Liebel | Apr. 29, 1958 |

FOREIGN PATENTS

| | | |
|---|---|---|
| 201,569 | Australia | Apr. 7, 1955 |

UNITED STATES PATENT OFFICE

CERTIFICATE OF CORRECTION

Patent No. 2,942,592　　　　　　　　　June 28, 1960

Siegfried Meurer

It is hereby certified that error appears in the above numbered patent requiring correction and that the said Letters Patent should read as corrected below.

In the grant, line 1, and in the heading to the printed specification, line 3, name of inventor, for "Siegfried Meuer" read -- Siegfried Meurer --.

Signed and sealed this 15th day of November 1960.

(SEAL)
Attest:

KARL H. AXLINE
Attesting Officer

ROBERT C. WATSON
Commissioner of Patents